(12) United States Patent
Asano et al.

(10) Patent No.: US 7,761,926 B2
(45) Date of Patent: Jul. 20, 2010

(54) INFORMATION RECORDING/PLAYBACK SYSTEM

(75) Inventors: Tomoyuki Asano, Kanagawa (JP); Yoshitomo Osawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 627 days.

(21) Appl. No.: 11/325,413

(22) Filed: Jan. 5, 2006

(65) Prior Publication Data

US 2006/0120237 A1   Jun. 8, 2006

Related U.S. Application Data

(63) Continuation of application No. 09/647,961, filed as application No. PCT/JP00/00658 on Feb. 7, 2000, now Pat. No. 6,999,587.

(30) Foreign Application Priority Data

Feb. 8, 1999   (JP)   ................... 11-030600

(51) Int. Cl.
   *G06F 9/00* (2006.01)
(52) U.S. Cl. ................ 726/30; 380/203; 386/94; 369/47.13
(58) Field of Classification Search ............. 360/60; 386/94; 369/47.13; 380/201, 202, 203; 705/57; 726/30
   See application file for complete search history.

(56) References Cited

U.S. PATENT DOCUMENTS

| 4,577,289 A | | 3/1986 | Comerford et al. |
| 4,584,641 A | | 4/1986 | Guglielmino |
| 4,734,796 A | * | 3/1988 | Grynberg et al. .............. 360/60 |
| 4,849,836 A | | 7/1989 | Kachikian |
| 5,513,169 A | * | 4/1996 | Fite et al. .................... 720/718 |
| 5,724,327 A | | 3/1998 | Timmermans et al. |
| 6,226,770 B1 | | 5/2001 | Barchan |
| 6,999,587 B1 | * | 2/2006 | Asano et al. ................. 380/202 |

FOREIGN PATENT DOCUMENTS

| JP | 7-182766 | 7/1995 |
| JP | 8-36747 | 2/1996 |
| JP | 8-339629 | 12/1996 |
| JP | 9-55730 | 2/1997 |
| JP | 9-73414 | 3/1997 |

(Continued)

OTHER PUBLICATIONS

Japanese Office Action dated Sep. 29, 2009, for corresponding JP 2000-597802, 3 pages.

(Continued)

*Primary Examiner*—Matthew B Smithers
*Assistant Examiner*—Paul Callahan
(74) *Attorney, Agent, or Firm*—Finnegan, Henderson, Farabow, Garrett & Dunner, L.L.P.

(57) ABSTRACT

An information recording medium 1 is provided with: a user data recording part 3 which records user data; a random-pattern-information recording part 4 which records random pattern information from a random physical phenomenon; and an authentication data recording part 5 which records, as authentication data, medium identification information created on the basis of the random pattern information detected from the random-pattern-information recording part 4 and a digital signature for each manufacturer with respect to the medium identification information.

10 Claims, 14 Drawing Sheets

FOREIGN PATENT DOCUMENTS

| | | |
|---|---|---|
| JP | 10-6673 | 1/1998 |
| JP | 10-21144 | 1/1998 |
| JP | 10-79119 | 3/1998 |
| JP | 10-105974 | 4/1998 |
| JP | 10-233019 | 9/1998 |
| JP | 10-336172 | 12/1998 |
| JP | 11-7412 | 1/1999 |
| JP | 11-205305 | 7/1999 |
| JP | 2002-500796 | 1/2002 |
| WO | WO 97/14146 | 4/1997 |
| WO | WO 98/01852 | 1/1998 |

OTHER PUBLICATIONS

Japanese Office Action dated Dec. 8, 2009, for corresponding JP 2000-597802, 2 pages.

Japanese Office Action dated Feb. 23, 2010, for corresponding JP 2000-597802, 2 pages.

* cited by examiner

REVOCATION LIST

| VERSION NUMBER |
| --- |
| MANUFACTURER ID |
| . . . |
| |
| |

FIG.6

PUBLIC KEY LIST

| VERSION NUMBER OF LATEST REVOCATION LIST | | |
| --- | --- | --- |
| MANUFACTURER ID | PUBLIC KEY | REVOCATION FLAG (YES/NO) |
| . . . | . . . | . . . |
| | | |
| | | |

FIG.7

INFORMATION RECORDING/PLAYBACK SYSTEM

This is a continuation of application Ser. No. 09/647,961, filed Nov. 27, 2000 now U.S. Pat. No. 6,999,587, the disclosure of which is incorporated herein by reference. Application Ser. No. 09/647,961 is the U.S. National Stage of PCT/JP00/00658, filed on Feb. 7, 2000, and claims priority to Application No. 11-030600 filed on Feb. 8, 1999 in Japan.

TECHNICAL FIELD

The present invention relates to an information recording/playback system which prevents illegal copying of recording media, and to an information recording apparatus, an information playback apparatus, an authentication data recording apparatus, an authentication processing apparatus, an information recording/playback method, an information recording method, an information playback method, an authentication data recording method, an information-recording-medium authentication method, and an information recording medium.

BACKGROUND ART

In recent years, apparatuses for transmitting and recording digital data such as music information and video information have come to be widely used in households. Since data can be recorded and read with high quality in these apparatuses, it is possible to construct a recording system in which there is no deterioration in quality even if copying is performed repeatedly. Such a recording system must include a copyright protection function to prevent copyrighted data from being illegally copied.

As such a system for the protection of copyright, for example, there is a content scrambling system in a digital video disc (DVD) ROM.

In this system, all copyrighted data on a disk is encrypted and only an apparatus which has received a license is given an encryption key for obtaining meaningful data by decrypting encrypted data. The licensed apparatus is designed to conform with operation specifications so that illegal copying may not be performed.

However, the method employed in a DVD system such as that described above is effective for ROM media, but it is not effective for RAM media in which data can be recorded by a user. The reason for this is that, in RAM media, although an unauthorized person cannot decrypt encrypted data, the person can newly create a disk which operates in an authorized apparatus by copying all the data on a disk to a new disk.

DISCLOSURE OF THE INVENTION

Accordingly, an object of the present invention is to provide an information recording/playback system constituting an illegal-copying prevention system which is also effective for RAM media, and to provide an information recording apparatus, an information playback apparatus, an authentication data recording apparatus, an authentication processing apparatus, an information recording/playback method, an information recording method, an information playback method, an authentication data recording method, an information-recording-medium authentication method, and an information recording medium.

The present invention is an information recording/playback system for recording and playing back information and is characterized by comprising: an authentication data recording control part which provides control of detecting random pattern information based on random physical phenomena from a random-pattern-information recording part used for recording such random-physical-phenomena-based random pattern information on an information recording medium; generating medium identification information from the random pattern information; and recording the medium identification information as authentication data in the authentication data recording part on the information recording medium; an authentication processing part which detects the random pattern information from the random-pattern-information recording part, generates medium-identification-information verification data from the random pattern information; reads authentication data from the authentication data recording part on the information recording medium; and performs authentication processing for the information recording medium based on medium-identification-information verification data generated from the random pattern information and based on the authentication data; and an information recording/playback control part which provides control of recording information on an information recording medium and playing back information from an information recording medium based on an authentication result from the authentication processing part.

Furthermore, the present invention is an information recording apparatus for recording information on an information recording medium including: a random-pattern-information recording part which records random pattern information based on random physical phenomena; and an authentication data recording part which stores, as authentication data; medium identification information created according to random pattern information detected from the random-pattern-information recording part, and is characterized by comprising: a random-pattern-information detection part which detects random pattern information from the random-pattern-information recording part on the information recording medium; a verification data creation part which creates medium-identification-information verification data from random pattern information detected by the random-pattern-information detection part; an authentication processing part which reads authentication data from the authentication data recording part on the information recording medium; performs authentication processing for an information recording medium based on medium-identification-information verification data created by the verification data creation part and based on the authentication data; and controls whether to enable writing information onto an information recording medium based on an authentication result; and a recording control part which provides control of recording information onto an information recording medium.

Furthermore, the present invention is an information playback apparatus for playing back information from an information recording medium including: a random-pattern-information recording part which records random pattern information based on random physical phenomena; and an authentication data recording part which stores; as authentication data; medium identification information created according to random pattern information detected from the random-pattern-information recording part; and is characterized by comprising: a random-pattern-information detection part which detects random pattern information from the random-pattern-information recording part on the information recording medium; a verification data creation part which creates medium-identification-information verification data from random pattern information detected by the random-pattern-information detection part; an authentication processing part which reads authentication data from the authentication data recording part on the information recording medium, and performs authentication processing for an information recording medium based on medium-identification-information verification data created by the verification data creation part and based on the authentication data; and a playback control part which provides control of reading information from an information recording medium.

In an authentication data recording apparatus which records authentication information on an information recording medium, the present invention is characterized by comprising: a random-pattern-information detection part which detects random pattern information from a random-pattern-information recording part on an information recording medium used for recording random pattern information based on random physical phenomena; a medium identification information creation part which creates medium identification information from the random pattern information detected by the random-pattern-information detection part; and an authentication data recording control part which provides control of recording, as authentication data, medium identification information created by the medium identification information creation part by using an authentication data recording part on the information recording medium.

In an authentication processing apparatus which performs authentication processing for an information recording medium, the present invention is characterized by comprising: a random-pattern-information detection part which detects random pattern information from a random-pattern-information recording part on the information recording medium; a verification data creation part which creates medium-identification-information verification data from random pattern information detected by the random-pattern-information detection part; and an authentication processing part which plays backs authentication data from a authentication data recording part on an information recording medium and performs authentication processing for an information recording medium based on medium-identification-information verification data created by the verification data creation part and based on the authentication data.

Further, the present invention is an information recording/playback method for recording and playing back information, and is characterized by comprising: an authentication data recording control process which detects random pattern information based on random physical phenomena from a random-pattern-information recording part used for recording random pattern information based on random physical phenomena on an information recording medium, creates medium identification information from the random pattern information, and controls recording; as authentication data; the medium identification information in an authentication data recording part on the information recording medium; an authentication process which detects the random pattern information from the random-pattern-information recording part; creates medium-identification-information verification data from the random pattern information; reads authentication data from an authentication data recording part on the information recording medium; and performs authentication processing for the information recording medium based on medium-identification-information verification data created from the random pattern information and based on the authentication data; and an information recording/playback control process which provides control of recording information on an information recording medium and playing back information from an information recording medium based on an authentication result from the authentication process.

Furthermore, the present invention is an information recording method for recording information on an information recording medium including: a random-pattern-information recording part which records random pattern information based on random physical phenomena; and an authentication data recording part which stores, as authentication data, medium identification information created according to random pattern information detected from the random-pattern-information recording part; and is characterized by comprising: a random-pattern-information detection process which detects random pattern information from a random-pattern-information recording part on an information recording medium; a verification data creation process which creates medium-identification-information verification data from random pattern information detected by the random-pattern-information detection process; an authentication process which reads authentication data from the authentication data recording part on an information recording medium; performs authentication processing for an information recording medium based on medium-identification-information verification data created by the verification data creation process and based on the authentication data; and controls whether to enable writing information onto an information recording medium based on an authentication result; and a recording control process which provides control of recording information onto an information recording medium.

Furthermore, the present invention is an information playback method for playing back information from an information recording medium including: a random-pattern-information recording part which records random pattern information based on random physical phenomena; and an authentication data recording part which stores; as authentication data, medium identification information created according to random pattern information detected from the random-pattern-information recording part; and is characterized by comprising: a random-pattern-information detection process which detects random pattern information from a random-pattern-information recording part on an information recording medium; a verification data creation process which creates medium-identification-information verification data from random pattern information detected by the random-pattern-information detection process; an authentication process which reads authentication data from an authentication data recording part on the information recording medium; and performs authentication processing for an information recording medium based on medium-identification-information verification data created by the verification data creation process and based on the authentication data; and a playback control process which controls reading information from an information recording medium.

In an authentication data recording method which records authentication information on an information recording medium, the present invention is characterized by comprising: a random-pattern-information detection process which detects random pattern information from a random-pattern-information recording part on an information recording medium used for recording random pattern information based on random physical phenomena; a medium identification information creation process which creates medium identification information from the random pattern information detected by the random-pattern-information detection part; and an authentication data recording control process which provides control of recording, as authentication data; medium identification information created by the medium identification information creation process by using an authentication data recording part on the information recording medium.

In an authentication processing method which performs authentication processing for an information recording medium, the present invention is characterized by comprising: a random-pattern-information detection process which detects random pattern information from a random-pattern-information recording part on an information recording medium; a verification data creation process which creates medium-identification-information verification data from random pattern information detected by the random-pattern-information detection process; and an authentication process which plays back authentication data from an authentication data recording part on an information recording medium, and performs authentication processing for an information recording medium based on medium-identification-information verification data created by the verification data creation process and based on the authentication data.

With respect to information recording medium for recording information, the present invention is characterized by comprising: a random-pattern-information recording part which records random pattern information based on random physical phenomena; an authentication data recording part which stores, as authentication data, medium identification information created according to random pattern information detected from the random-pattern-information recording part; and an information recording part for recording information.

BRIEF DESCRIPTION OF THE DRAWINGS

FIG. 6 is a view showing a revocation list used for authentication processing by the authentication processing part;

FIG. 7 is a view showing a public key list used for authentication processing by the authentication processing part;

BEST MODE FOR CARRYING OUT THE INVENTION

The best mode for carrying out the present invention is described in detail below with reference to the drawings.

Figure 1:
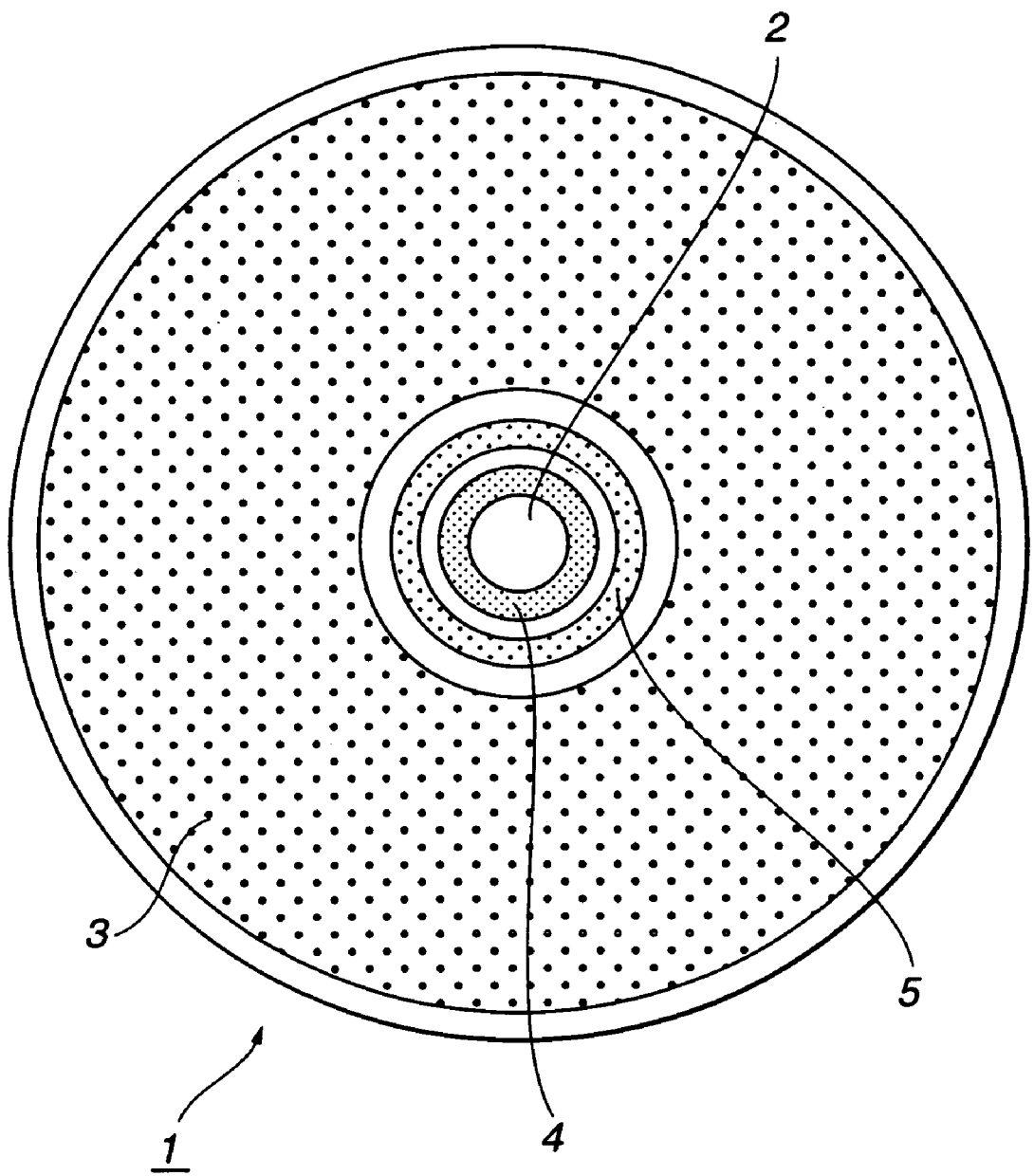
FIG. 1 is a view illustrating an optical disk to which the present invention is applied.

The present invention is applied to a recording/playback system employing, for example, an optical disk 1 having a construction such as that shown in FIG. 1.

The optical disk 1 shown in FIG. 1 is a disk medium into which and from which information can be recorded/played back, and has a user data recording part 3, a random-pattern-information recording part 4, and an authentication data recording part 5, which are three information recording areas formed annularly around a center hole 2 at the center. The user data recording part 3, the random-pattern-information recording part 4, and the authentication data recording part 5 are placed, for example, so as to be separated in a two-dimensional manner or separated in a three-dimensional manner so that these parts can be accessed independently of each other in order to read information.

In this optical disk 1, the information recording area is separated in a two-dimensional manner in the radial direction of the disk, thereby forming the user data recording part 3, the random-pattern-information recording part 4, and the authentication data recording part 5.

In this optical disk 1, the user data recording part 3 formed in the periphery thereof is a data area in which user data is recorded or played back. Namely, this area records contents such as video, music, and the like.

Also, the random-pattern-information recording part 4 which is formed in a central part thereof is a read-only area in which random pattern information based on random physical phenomena is recorded.

This random-pattern-information recording part 4 is formed by randomly scattering, for example, fine magnetized fibers in the area of this random-pattern-information recording part 4 and by fixing them when the medium is manufactured. The random-pattern-information recording part 4 formed in this manner is one in which the random pattern information in the fine magnetized fibers is recorded so that it can be detected.

The random-pattern-information recording part 4 may be such that bits are randomly formed and the jitter thereof can be detected as random pattern information.

Furthermore, the authentication data recording part 5 which is formed in the outer periphery of the random-pattern-information recording part 4 is an area in which medium identification information created based on the random pattern information detected from the random-pattern-information recording part 4 and a digital signature for each manufacturer with respect to the medium identification information are recorded as authentication data. This authentication data recording part 5 is provided in a lead-in area.

Figure 2:
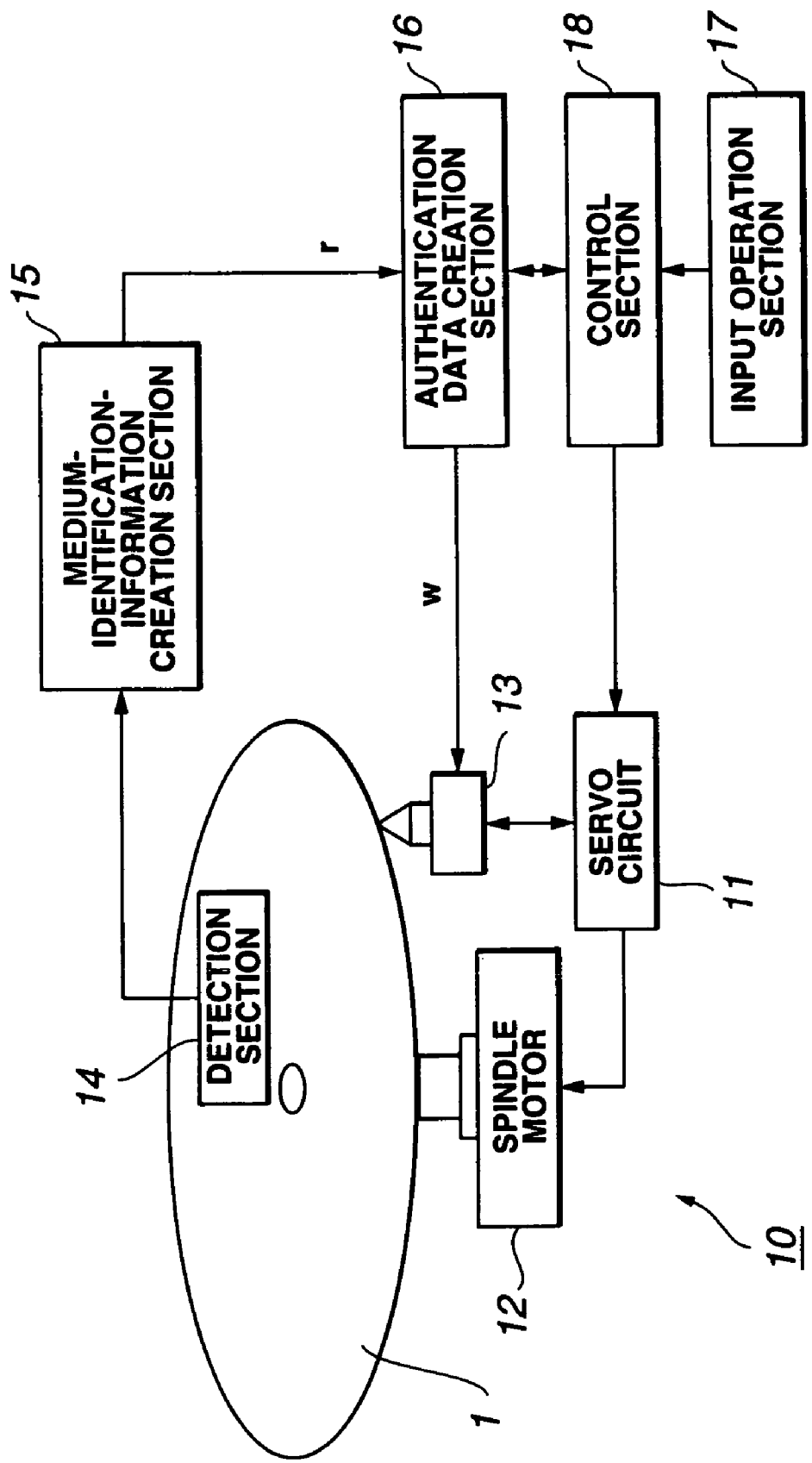
FIG. 2 is a block diagram showing the construction of an authentication data recording apparatus for recording authentication data on the optical disk.

In the optical disk 1 having such a construction, authentication data is recorded in the authentication data recording part 5 by an authentication data recording apparatus 10 constructed, for example, as shown in FIG. 2.

This authentication data recording apparatus 10 shown in FIG. 2 comprises a spindle motor 12 controlled by a servo circuit 11, a recording/playback head 13 which optically scans the information recording surface of the optical disk 1, a random-pattern-information detection part 14 for detecting random pattern information from the random-pattern-information recording part 4 of the optical disk 1, a medium-identification-information creation part 15 for creating medium identification information r, an authentication data creation part 16 for creating authentication data, and a control section 18 for controlling the servo circuit 11 and the authentication data creation section 16 on the basis of the setting information input from an input operation section 17.

The spindle motor 12 drivingly rotates the optical disk 1, for example, at a constant linear velocity under the control of the servo circuit 11.

The recording/playback head 13, which comprises an optical head for optically scanning the authentication data recording part 5 of the optical disk 1 which is drivingly rotated by the spindle motor 12, records and plays back authentication data via the authentication data recording part 5.

The random-pattern-information detection part 14 comprises a magnetic head for scanning the random-pattern-information recording part 4 of the optical disk 1 which is drivingly rotated by the spindle motor 12, and detects in an analog manner the random pattern information from the random-pattern-information recording part 4. This random-pattern-information detection part 14 supplies the random pattern information detected from the random-pattern-information recording part 4 to the medium-identification-information creation part 15.

The medium-identification-information creation part 15 converts the random pattern information detected in an analog manner by the random-pattern-information detection part 14 into digital random pattern information, and supplies this information as medium identification information r to the authentication data creation part 16.

The authentication data creation part 16 affixes a digital signature for each manufacturer with respect to the medium identification information r, to the medium identification information r supplied from the medium identification information creation part 15 in order to use it as authentication data.

Here, in creating authentication data to which a digital signature for each manufacturer is affixed by the authentication data creation part 16, the manufacturer for the recording medium uses a trusted center (TC), and registers its own public key required for the verification of the digital signature in the TC so as to request the TC to issue a certificate (Cert) in advance. The certificate (Cert) is data in which the TC has made a digital signature on the identification information ID of the manufacturer, the public key, etc.

The digital signature technology is a technology capable of certifying that a person who created particular data is a particular user. For example, an elliptic curve digital signature algorithm (EC-DSA) method used in the IEEE P1363 is well known.

Figure 3:
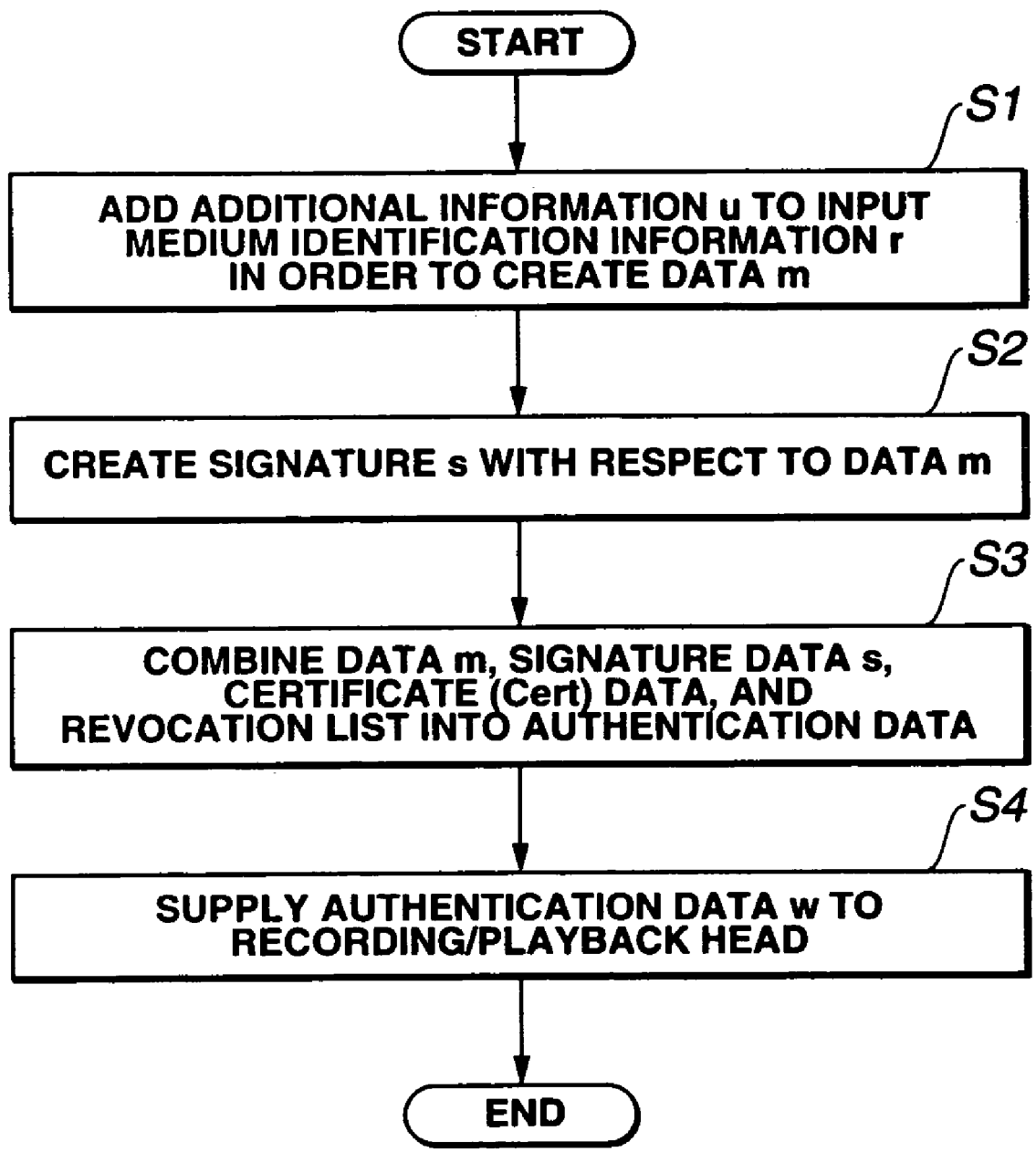
FIG. 3 is a flowchart showing specific processing contents of an authentication data creation part in the authentication data recording apparatus.

In this authentication data recording apparatus 10, as the specific processing contents of the authentication data creation part 16 are shown in FIG. 3, additional information u such as the manufacturing date of the medium and the manufacturer ID is added to the medium identification information r supplied from the medium identification information creation part 15 in order to create data m (step S1). For this data m, digital signature data s is created by using a secret key for each manufacturer corresponding to the public key registered in the trusted center (step S2).

The additional information u is data which may be added to the medium identification information r as required.

Then, the authentication data creation part 16 combines the data m, the digital signature data s, the certificate (Cert) data, and the revocation list into authentication data w (step S3), and supplies this authentication data w to the recording/playback head 13 (step S4), whereby it is written in the authentication data recording part 5 of the optical disk 1.

Here, the additional information u, the secret key for each manufacturer, and the certificate (Cert) data are input, for example, from the input operation part 17 to the control part 18, whereby it is provided from the control part 18 to the authentication data creation part 16.

In this authentication data recording apparatus 10, the revocation list provided from the trusted center is input from the input operation part 17 to the control part 18, whereby the revocation list is provided from the control part 18 to the authentication data creation part 16 so that the revocation list can be recorded in the authentication data recording part 5 of the optical disk 1. In the authentication data recording part 5 of the optical disk 1, the latest revocation list provided from the trusted center is recorded.

Here, the revocation list is such that the trusted center has made a digital signature on the version number thereof which increases monotonously and the identification information ID of the manufacturer to which the secret key has been revealed and which is determined to have committed a fraud.

The manufacturer of the recording medium is able to manufacture the optical disk 1 in which the data m, the digital signature data s, the certificate (Cert) data, and the revocation list are recorded as authentication data w in the authentication data recording part 5 by the authentication data recording apparatus 10 constructed as described above.

The optical disk 1 having such a construction is capable of verifying the validity by authentication processing by the random pattern information detected from the random-pattern-information recording part 4 in which random pattern information from a random physical phenomenon is recorded, and the authentication data recorded in the authentication data recording part 16. The random pattern information recorded in the random-pattern-information recording part 4 cannot be reproduced because it is from a random physical phenomenon.

Figure 4:
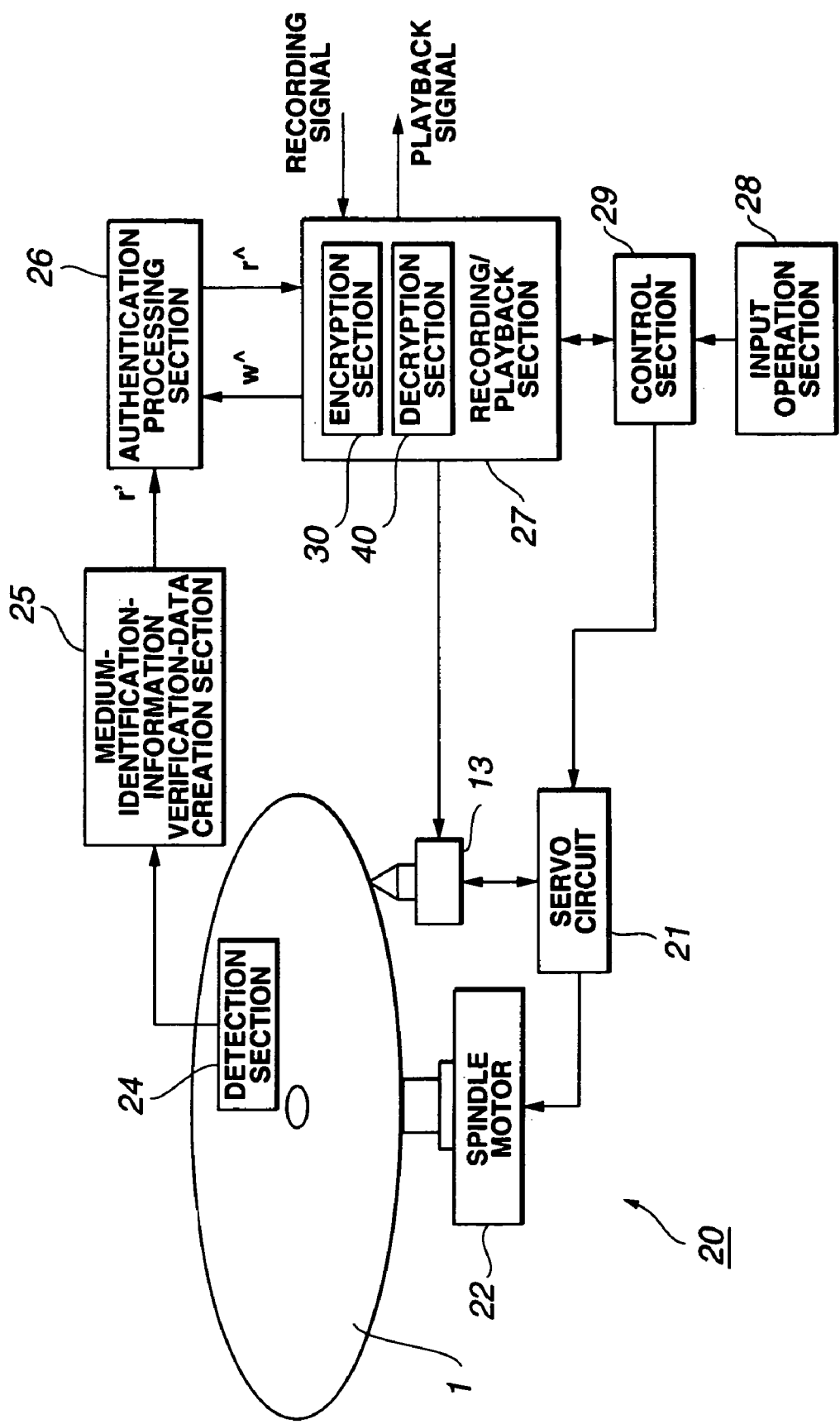
FIG. 4 is a block diagram showing the construction of an optical disk recording/playback apparatus which uses the optical disk.

In the optical disk 1 having a construction such as that described above, data is recorded or played back, for example, by an optical disk recording/playback apparatus 20 having a construction such as that shown in FIG. 4.

The optical disk recording/playback apparatus 20 shown in FIG. 4 comprises a spindle motor 22 controlled by a servo circuit 21; a recording/playback head 23 which optically scans the information recording surface of the optical disk 1; a random-pattern-information detection part 24 for detecting random pattern information from the random-pattern-information recording part 4 of the optical disk 1; a medium-identification-information verification-data creation part 25 for creating medium-identification-information verification data r'; an authentication processing part 26; a recording/playback part 27; and a control part 19 for controlling the servo circuit 21 and the recording/playback part 27 on the basis of setting information input from an input operation part 28.

The spindle motor 22 drivingly rotates the optical disk 1, for example, at a constant linear velocity under the control of the servo circuit 21.

The recording/playback head 23 comprises an optical head for optically scanning the information recording surface of the authentication data recording part 5 of the optical disk 1 which is drivingly rotated by the spindle motor 22. The recording/playback head 23 plays back the authentication data recorded in the authentication data recording part 5, and records data on and plays back data from the user data recording part 3.

The random-pattern-information detection part 24 comprises a magnetic head for scanning the random-pattern-information recording part 4 of the optical disk 1 which is drivingly rotated by the spindle motor 22, and detects in an analog manner random pattern information from the randompattern-information recording part 4. This random-pattern-information detection part 24 supplies the random pattern information detected from the random-pattern-information recording part 4 to the medium-identification-information verification-data creation part 25.

The medium-identification-information verification-data creation part 25 accomplishes a conversion from information detected by the random-pattern-information detection part 24 in an analog manner to digital random pattern information and supplies this information as medium-identification-information verification data r' to the authentication processing part 26.

The authentication processing part 26 performs a process for authenticating that the optical disk 1 is manufactured by an authorized manufacturer. The recording/playback part 27 supplies this authentication processing part 26 with authentication data wˆ which is read by the recording/playback head 23 from the authentication data recording part 5 of the optical disk 1. The authentication processing part 26 performs an authentication process on the basis of the medium-identification-information verification data r' supplied from the medium-identification-information creation part 25 and the authentication data wˆ.

Figure 5:
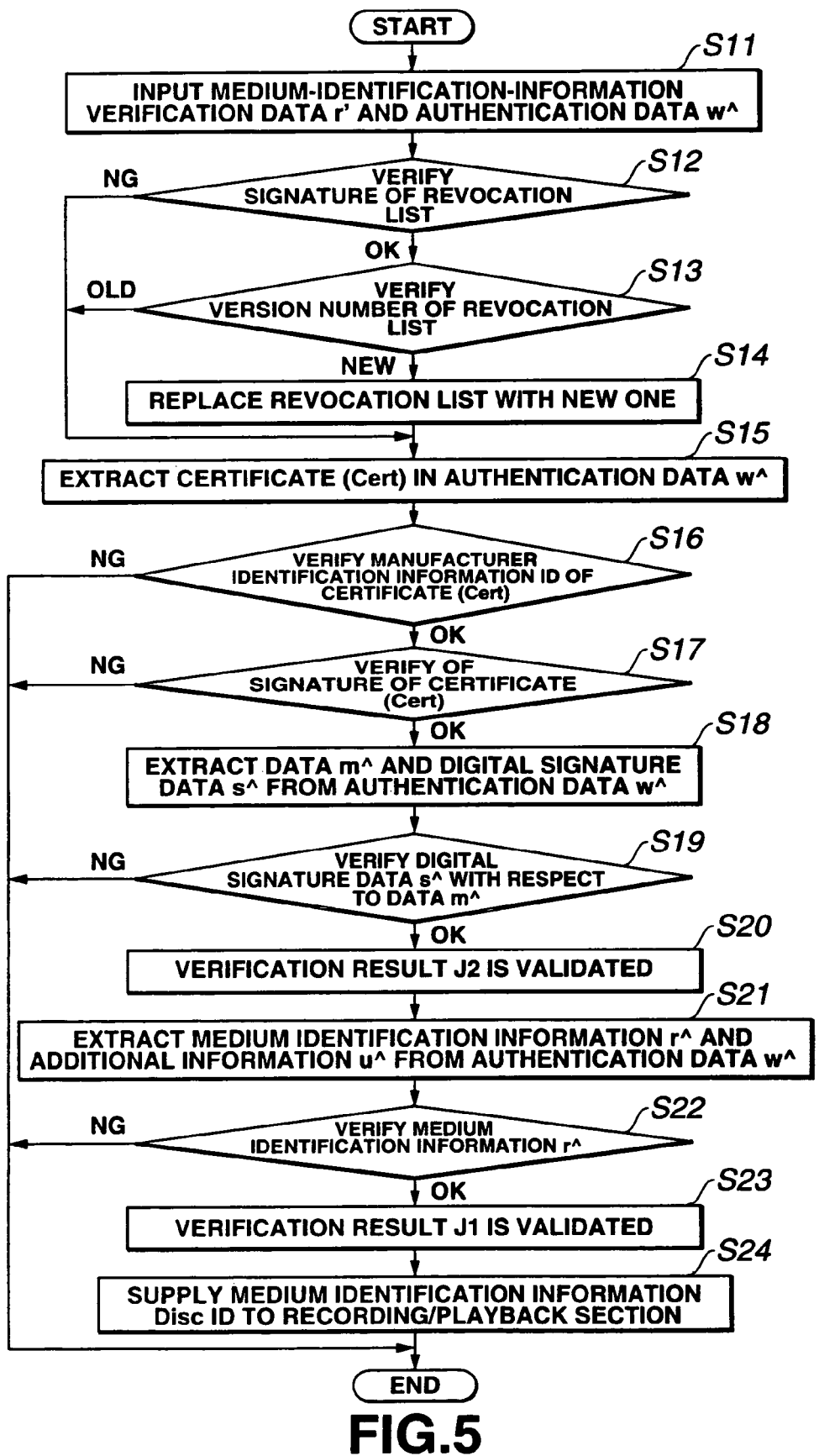
FIG. 5 is a flowchart showing specific processing contents of an authentication processing part in the optical disk recording/playback apparatus.

The specific processing contents of the authentication processing part 26 are shown in FIG. 5.

More specifically, when the medium-identification-information verification data r' and the authentication data wˆ are input (step S11), initially, the authentication processing part 26 verifies the validity of the revocation list which is entered in the authentication data wˆ, that is, the validity of the digital signature of the trusted center, by using the public key of the trusted center (step S12). The public key of the trusted center is common to the entire system, and is stored in a nonvolatile memory within the apparatus when the apparatus is manufactured.

As a result of the verification of the revocation list, when the revocation list is valid, the version number of the revocation list is verified (step S13). When the revocation list is compared with the currently stored revocation list and the version number is newer, the revocation list is stored in the nonvolatile memory (step S14). A revocation list such as that shown in FIG. 6 is stored in the nonvolatile memory.

Next, the certificate (Cert) data in the authentication data WA is extracted (step S15). It is verified that the identification information ID of the manufacturer contained in the certificate (Cert) data is not in the revocation list stored in the nonvolatile memory (step S16). Furthermore, it is verified that the digital signature of the trusted center, contained in the certificate (Cert) data, is correct (step S17).

When this verification is passed, data mˆ and digital signature data sˆ are extracted from the authentication data wˆ (step S18). It is verified by using the public key of the manufacturer in the certificate (Cert) data that the digital signature data sˆ in the authentication data wˆ is a correct digital signature of the manufacturer with respect to the data mA (step S19).

When this verification is passed, the verification result J2 is assumed to be passed (step S20).

Next, medium identification information rˆ and additional information uˆ are extracted from the authentication data wˆ (step S21).

Then, the medium identification information rˆ extracted from the authentication data wˆ is compared with the medium-identification-information verification data r' created by the medium-identification-information creation part 25 in order to verify that the difference is within a predetermined error (step S22). This example uses an allowable error in consideration of a possible error due to noises because digital medium-identification-information verification data r' is generated from random pattern information detected as an analog signal. No allowable error needs to be used when random pattern information is digitally recorded and read.

When this verification is passed, the verification result J1 is assumed to be passed (step S23).

When both the verification result J1 and the verification result J2 are passed, this recording medium is determined to be an authorized one, and the medium identification information r' is supplied as authenticated medium identification information DiscID to the recording/playback part 27 (step S24).

Here, the nonvolatile memory may store a public key list such as that shown in FIG. 7.

In this case, the public key list stores the identification information ID of the manufacturer, the public key thereof, and a flag indicating whether or not the identification information ID is revoked. Furthermore, the public key list stores the version number of the latest version of the revocation lists which have been handled by the apparatus.

When this apparatus obtains a valid revocation list which is newer than any of those handled by the apparatus from the data wˆ, a revocation flag corresponding to the identification information ID given in that list is set to "YES", that is, is set to be revoked.

If the identification information ID is not in the table by that time, the item thereof is newly created and the flag is set to "YES".

In contrast, for those in which the identification information ID is not contained in the latest revocation list, although it is in the table stored by the apparatus, all the flags are set to "NO", that is, are set not to be revoked. Then, the item of the latest version number is updated.

When the certificate (Cert) data extracted from the authentication data wˆ is to be verified, the identification information ID of the manufacturer is checked. If the item of the identification information ID is in the stored list, the public key is recorded, and the revocation flag is "NO", the verification of the certificate (Cert) data is not necessary, and the public key recorded in the table is used.

When the item of the identification information ID is in the list, the flag is "NO", and the public key is not recorded, the certificate (Cert) data is verified, and when it is correct, the public key is stored in the table.

When the item of the identification information ID is in the list and the flag is "YES", the result of the verification J2 is assumed to be invalidated.

When the item of the identification information ID is not in the list, the certificate (Cert) data is verified. When it is correct, an item corresponding to the identification information ID is newly created, and the public key is stored. At this time, the flag is set to "NO".

As a result of having a public key list in this manner, in many cases, a medium manufactured by the same manufacturer is used; in most cases of a second time and thereafter, it is possible to omit the verification of the certificate (Cert) data.

In this optical disk recording/playback apparatus 20, the operations mode of the recording/playback part 27 is switched by the control part 29 in accordance with a control command input from the input operation part 28. This recording/playback part 27 comprises an encryption part 30 and a decryption part 40. In the recording mode, user data input from an external source is encrypted by the encryption part 30, and the encrypted user data is recorded in the user data recording part 3 of the optical disk 1 via the recording/playback head 23. Also, in the playback mode, encrypted user data which is read from the user data recording part 3 of the optical disk 1 by the recording/playback head 23 is decrypted by the decryption part 40, and is output to an external source.

Figure 8:
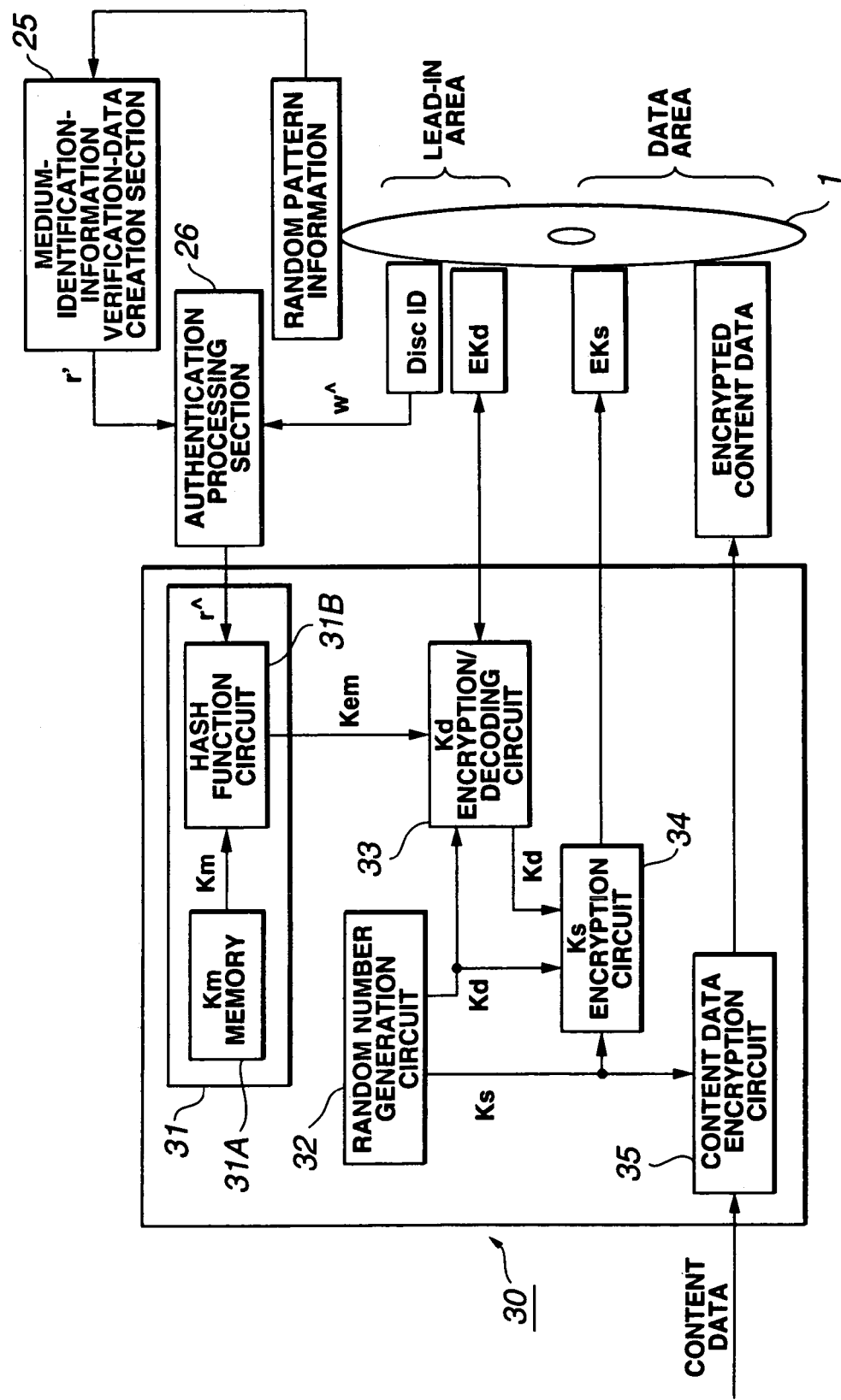
FIG. 8 is a block diagram showing the construction of an encryption part of a recording/playback circuit of the optical disk recording/playback apparatus.

The encryption part 30, as the specific construction thereof is shown in FIG. 8, comprises a Kem generation module 31, a random number generation circuit 32, a Kd encryption/decryption circuit 33, a Ks encryption circuit 34, and a content data encryption circuit 35.

The Kem generation module 31 comprises a Km memory 31A having a master key Km stored therein, and a hash function circuit 31B to which the master key Km is supplied from the Km memory 31A and to which authenticated medium identification information DiscID is supplied from the authentication processing part 26.

The master key Km is a secret key which is given when the license of copyright is received.

The hash function circuit 31B concatenates an n-bit master key Km and an m-bit medium identification information DiscID in order to create (n+m)-bit concatenated data (DiscID∥Km) in which, for example, the low-order bits are the master key Km and the high-order bits are the medium identification information DiscID, and applies a hash function H to the created concatenated data (DiscID∥Km), as shown in the following equation (1):

$$Kem = H(DiscID \| Km) \quad (1)$$

in order to create an effective master key Kem. Then, the hash function circuit 31B supplies the Kd encryption/decryption circuit 33 with the master key Km and the effective master key Kem created from the authenticated medium identification information DiscID.

Here, "∥" of A∥B means the concatenation of data A and data B. Also, the hash function is a function which outputs data of a fixed length, for example, 64 bits or 128 bits, with respect to input data of an arbitrary length, and is a function such that, when y (=hash (x)) is given, determination of x is difficult and determination of the set of x1 and x2 in which hash (x1)=hash (x2) is also difficult. As representative one-direction hash functions, MD5 (Message Digest) and SHA (Secure Hash Algorithm) are known. This one-direction hash function is described in detail in "Applied Cryptography (Second Edition), Wiley" written by Bruce Schneier.

Furthermore, the random number generation circuit 32 generates random numbers in which random numbers are used as a sector key Ksi and a disk key Kd, supplies the sector key Ksi to the Ks encryption circuit 34 and the content data encryption circuit 35, and supplies the disk key Kd to the Kd encryption/decryption circuit 33 and the Ks encryption circuit 34.

The Kd encryption/decryption circuit 33 encrypts, by the effective master key Kem, the disk key Kd supplied from the random number generation circuit 32 in order to create an encrypted disk key EKd. This encrypted disk key Ekd created by the Kd encryption/decryption circuit 33 is recorded in the lead-in area of the optical disk 1 via the recording/playback head 23. Also, this Kd encryption/decryption circuit 33 decrypts the encrypted disk key Ekd read from the lead-in area of the optical disk 1 via the recording/playback head 23 in order to create a disk key Kd. This disk key Kd created by the Kd encryption/decryption circuit 33 is supplied to the Ks encryption circuit 34.

Also, the Ks encryption circuit 34 encrypts, by the disk key Kd, the sector key Ksi supplied from the random number generation circuit 32 in order to create an encrypted sector key EKs. This encrypted sector key EKs created by the Ks encryption circuit 34 is recorded in the data area of the optical disk 1 via the recording/playback head 23.

Furthermore, the content data encryption circuit 35 creates encrypted content data by encrypting, by the sector key Ksi, the user data supplied as content data from an external source.

This encrypted content data created by the content data encryption circuit 35 is recorded in the data area of the optical disk 1 via the recording/playback head 23.

Figure 9:
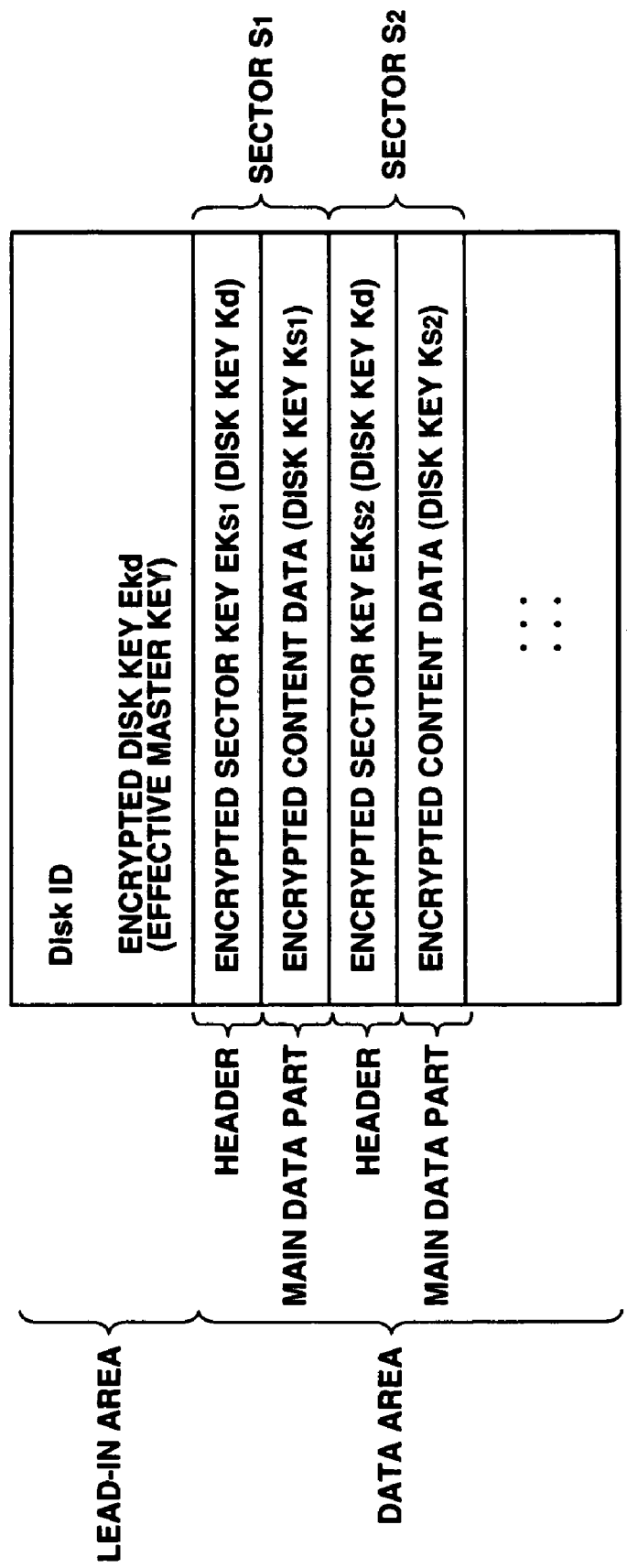
FIG. 9 is a view schematically showing the structure of data recorded on an optical disk by the optical disk recording/playback apparatus.

Here, the data area of the optical disk 1 is formed of a plurality of sectors Si (i=1, 2 . . . ), as shown in FIG. 9. Each sector Si (i=1. 2, . . . ) is formed of the header and the main data part. An encrypted sector key EKsi (i=1, 2, . . . ) in which the sector key Ksi is encrypted by the disk key Kd is stored in the header of each sector Si, and encrypted content data in which the user data is encrypted by the sector key Ksi is stored in the main data part of each sector Si. The above i=1, 2, . . . indicates the sector number. For simplicity, sector numbers are omitted in a part of figures and descriptions.

Figure 10:
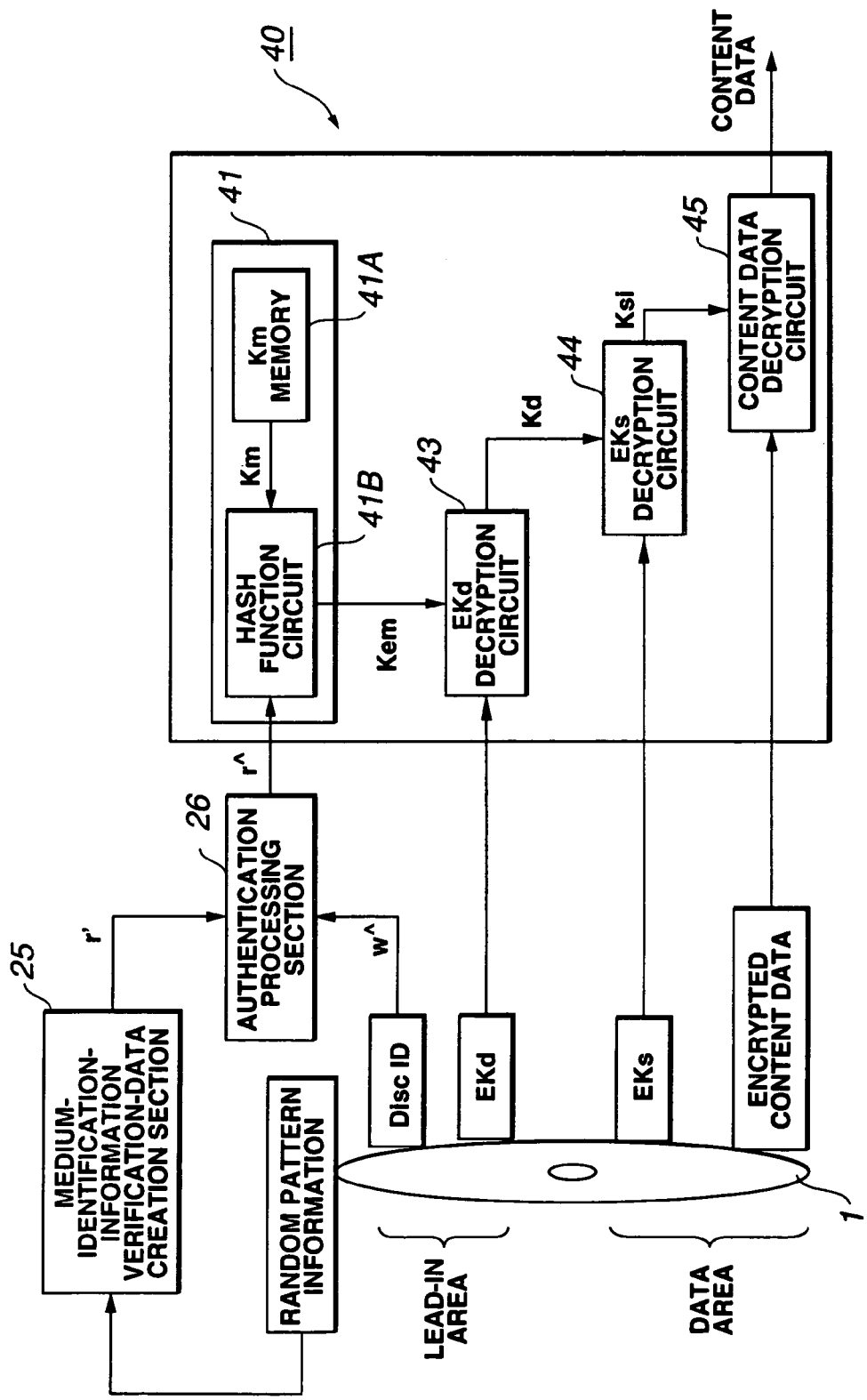
FIG. 10 is a block diagram showing the construction of a decryption part of the recording/playback circuit in the optical disk recording/playback apparatus.

The decryption part 40, as the specific construction thereof is shown in FIG. 10, comprises a Kem generation module 41, an EKd decryption circuit 43. an EKs decryption circuit 44 and a content data decryption circuit 45.

The Kem generation module 41 comprises a Km memory 41A having stored therein a master key Km which is a secret key which is given when the license of the copyright is received, and comprises a hash function circuit 41B which generates an effective master key Kem by a computation process shown in equation (1) described above from the master key Km supplied from the Km memory 41A and the authenticated medium identification information DiscID provided from the authentication processing part 26. The hash function circuit 41B supplies the EKd decryption circuit 43 with the master key Km and the effective master key Kem created from the authenticated medium identification information DiscID.

This Kem generation module 41 is constructed similarly to the Kem generation module 31 of the encryption part 30, and may also be used as the Kem generation module 31.

The EKd decryption circuit 43 creates the disk key Kd by decrypting, by the effective master key Km, the encrypted disk key Ekd read from the lead-in area of the optical disk 1 by the recording/playback head 23, and supplies the decrypted disk key Kd to the EKs decryption circuit 44.

The EKs decryption circuit 44 creates a sector key Ks by decrypting, by the disk key Kd, the encrypted sector key EKs read from the data area of the optical disk 1 by the recording/playback head 23, and supplies the decrypted sector key Ks to the content data decryption circuit 45.

The content data decryption circuit 45 decrypts, by the sector key Ks, the encrypted content data read from the data area of the optical disk 1 by the recording/playback head 23.

Figure 11:
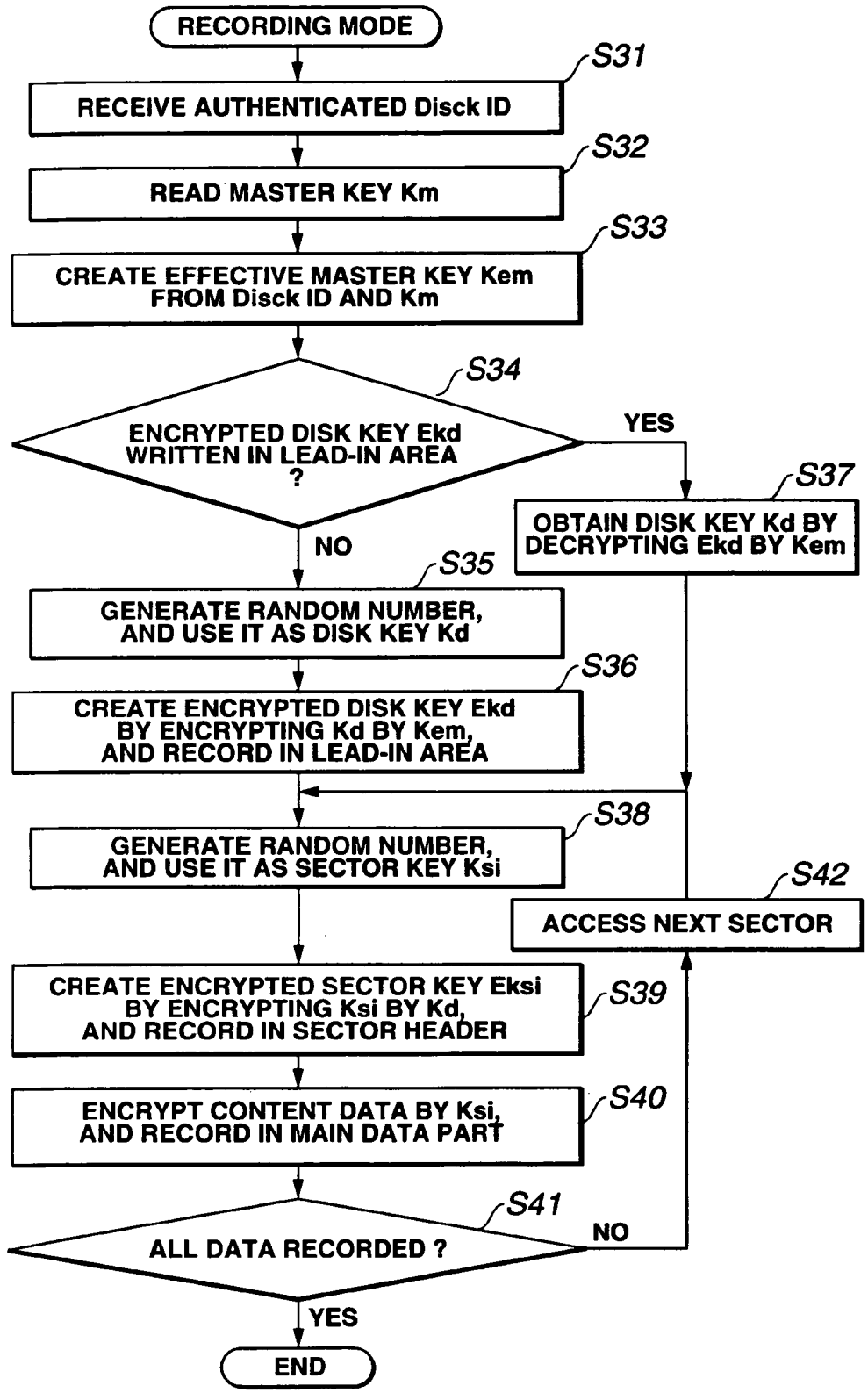
FIG. 11 is a flowchart showing the operation of a recording mode of the optical disk recording/playback apparatus.

In the optical disk recording/playback apparatus 20 constructed as described above, when a recording mode is set in the control part 29 as a result of a recording command being input from the input operation part 28, the control part 29 controls the recording/playback part 27 so that the user data is recorded in the optical disk 1 in accordance with the procedure such as that shown in the flowchart of FIG. 11.

In the following description, it is assumed that authentication processing has already been performed on the optical disk 1 by the authentication processing part 26 and user data is recorded on the optical disk 1 which is authenticated to be an authorized one.

In the recording mode, the encryption part 30 of the recording/playback part 27 is in an operating state, and the Kem generation module 31 of the encryption part 30 receives the authenticated medium identification information DiscID from the authentication processing part 26 (step S31), reads the master key Km from the Km memory 31A (step S32), and causes the hash function circuit 31B to create an effective master key Kem from the medium identification information DiscID and the master key Km (step S33).

Next, the Kd encryption/decryption circuit 33 determines whether or not the encrypted disk key Ekd has been recorded in the lead-in area of the optical disk 1 (step S34).

Then, when the encrypted disk key Ekd has not been recorded, the Kd encryption/decryption circuit 33 uses a random number of, for example, 40 bits, generated by the random number generation circuit 32 as a disk key Kd (step S35), creates an encrypted disk key Ekd by encrypting this disk key Kd by the effective master key Kem, and records this encrypted disk key Ekd in the lead-in area of the optical disk 1 (step S36).

When the encrypted disk key Ekd has been recorded, the Kd encryption/decryption circuit 33 obtains the disk key Kd by decrypting the encrypted disk key Ekd by the effective master key Km (step S37).

Next, the Ks encryption circuit 34 uses the 40-bit random number generated by the random number generation circuit 32 as a sector key Ksi (step S38), creates an encrypted sector key EKsi by encrypting this sector key Ksi by the disk key Kd, and records this encrypted sector key EKsi in the sector header (step S39).

Then, the content data encryption circuit 35 creates encrypted content data by encrypting the user data by the sector key Ksi, and records this encrypted content data in the main data part (step S40).

Furthermore, the content data encryption circuit 35 determines whether or not all the user data to be recorded has been recorded (step S41). When there is user data to be recorded, the next sector is accessed (step S42), and the process returns to step S38, whereby processing from step S38 to step S42 is performed repeatedly.

When all the user data has been recorded completely in the data area of the optical disk 1 in this manner, the recording mode is terminated.

Figure 12:
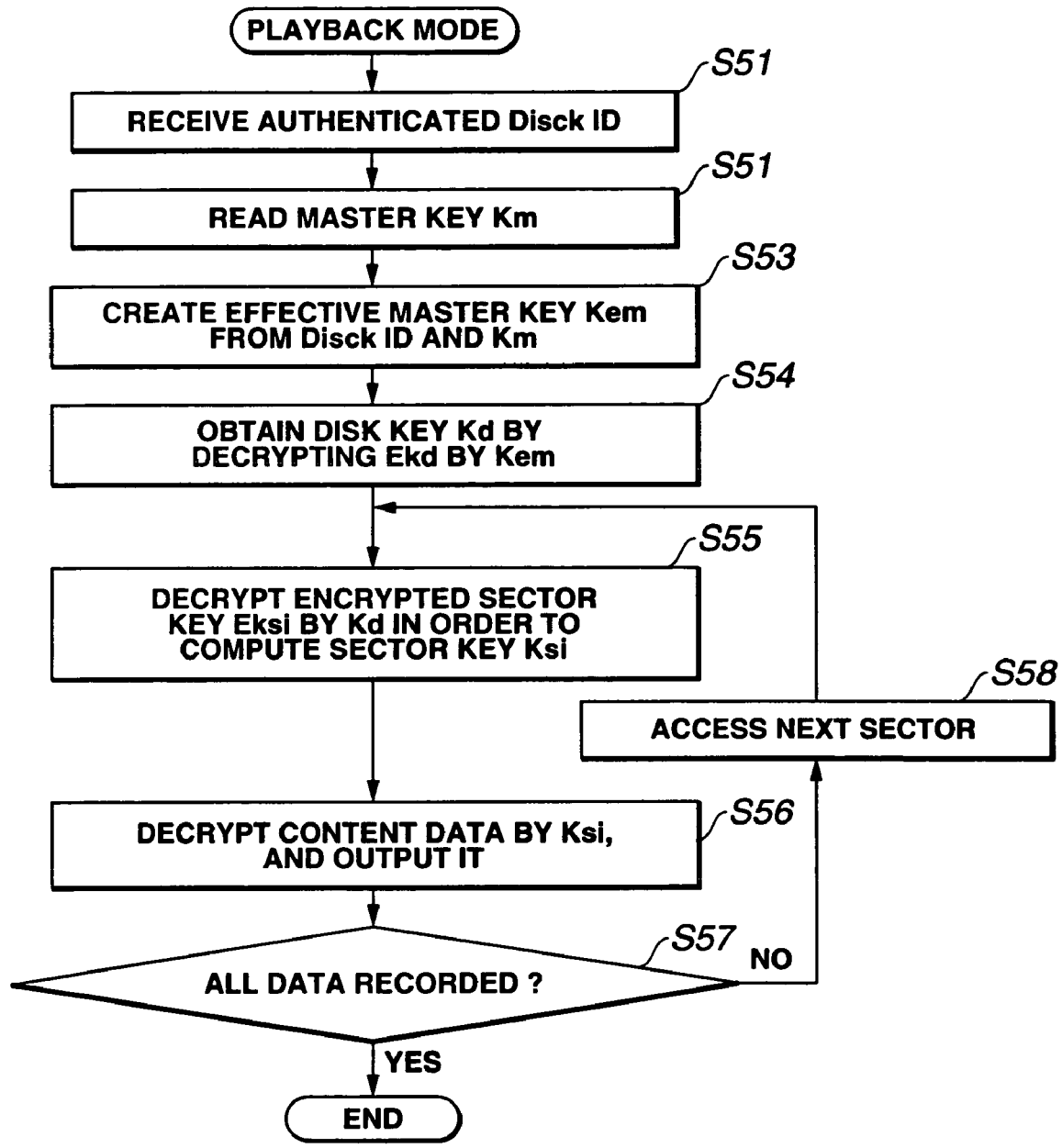
FIG. 12 is a flowchart showing the operation of a playback mode of the optical disk recording/playback apparatus.

Also, in this optical disk recording/playback apparatus 20, when a playback mode is set in the control part 29 as a result of a recording command being input from the input operation part 28, the control part 29 controls the recording/playback part 27 so that the user data is read from the optical disk 1 in accordance with the procedure such as that shown in the flowchart of FIG. 12.

In the following description, it is assumed that authentication processing has already been performed on the optical disk 1 by the authentication processing part 26 and user data is read from the optical disk 1 which is authenticated to be an authorized one.

In the playback mode, the decryption part 40 of the recording/playback part 27 is in an operating state. The Kem generation module 41 of the decryption part 40 receives authenticated medium identification information DiscID from the authentication processing part 26 (step S51), reads the master key Km from the Km memory 41A (step S52), and causes the hash function circuit 41B to create an effective master key Kem from the medium identification information DiscID and the master key Km (step S53).

Next, the EKd decryption circuit 43 creates the disk key Kd by decrypting, by the effective master key Kem, the encrypted disk key Ekd read from the lead-in area of the optical disk 1 (step S54).

Next, the EKs decryption circuit 44 creates a sector key Ksi by decrypting the encrypted sector key EKsi read from the data area of the optical disk 1 (step S55).

Then, the content data decryption circuit 45 decrypts, by the sector key Ks, the encrypted content data read from the data area of the optical disk 1 (step S56).

Furthermore, the content data decryption circuit 45 determines whether all the content data to be read has been read (step S57). When there is content data to be read, the next sector is accessed (step S58), and the process returns to step S25, whereby processing from step S55 to step S58 described above is performed repeatedly.

When all the required content data has been completely read from the data area of the optical disk 1 in this manner, the playback mode is terminated.

On the optical disk 1 of which user data recording part 3 records user data by means of the optical disk recording/playback apparatus 20, the data area records the encryption key for the user data, that is, the sector key Ks, as the encrypted sector key EKs encrypted by the disk key Kd. Furthermore, the lead-in area records the disk key Kd as an encrypted disk key Ekd which is encrypted by the effective master key Kem created on the basis of the master key Km and the medium identification information DiscID unique to this optical disk 1. Therefore, playing back the user data is only available on an authorized playback apparatus having the master key Km and an authentication processing function for performing authentication processing on the medium identification information DiscID based on the medium-identification-information verification data created according to the random pattern information recorded in the random-pattern-information recording part 4 of the optical disk 1 and based on the authentication data recorded in the authentication data recording part 5. Decrypting and playing back the user data is impossible on a playback apparatus which does not have the authentication processing function or the master key Km.

Also, even if the data of the data area and the lead-in area of the optical disk 1 is illegally copied as it is into a new disk, since the random pattern information recorded in the random-pattern-information recording part 4 of the optical disk 1 is from a random physical phenomenon, it is not possible to detect, from the random-pattern-information recording part of the new disk, the same random pattern information as the random pattern information recorded in the random-pattern-information recording part 4 of the optical disk 1 even if the new disk is an authorized one including a random-pattern-information recording part. Therefore, an illegally copied disk is not played back by the authorized playback apparatus.

Figure 13:
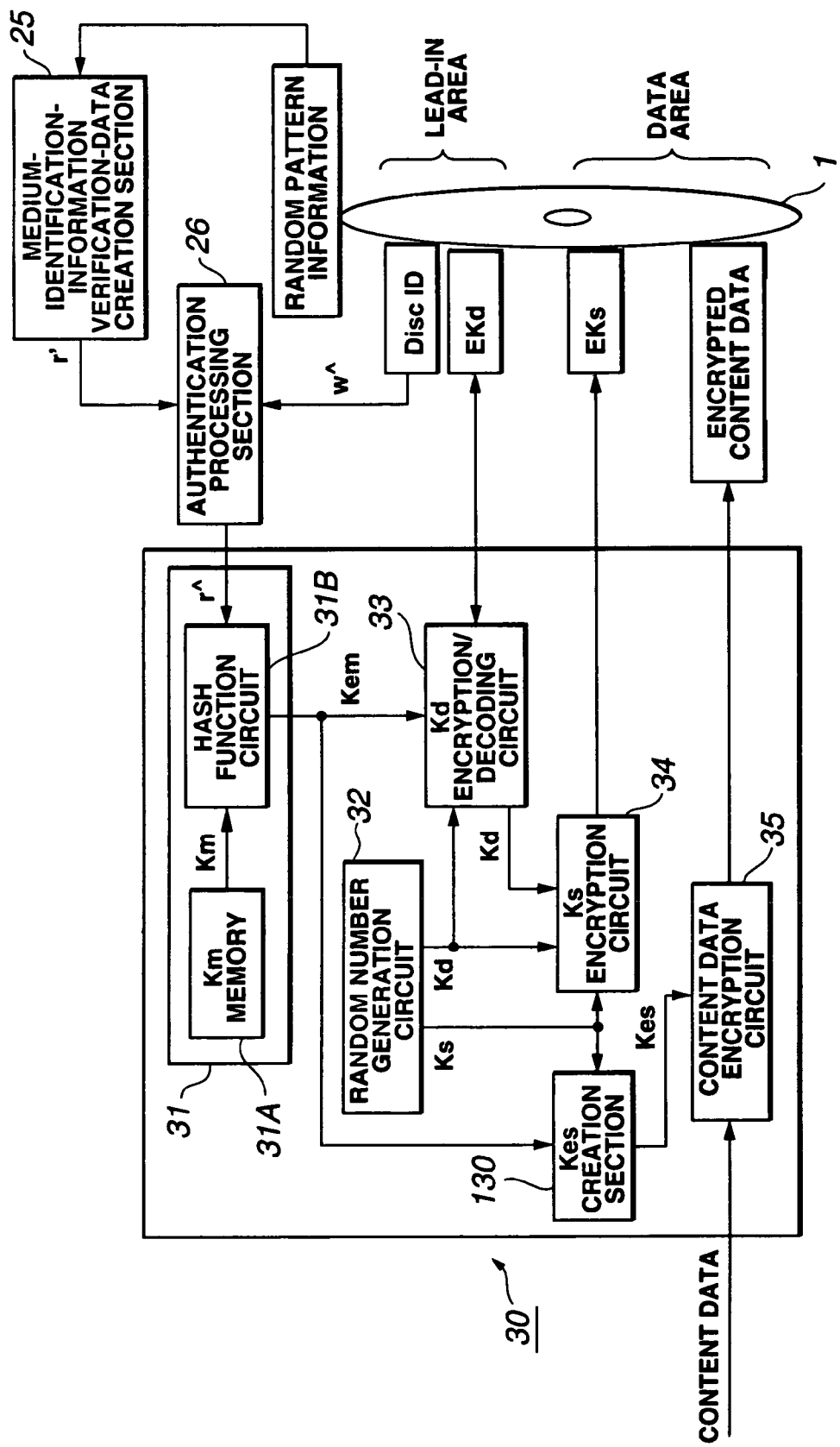
FIG. 13 is a block diagram showing another example of the construction of an encryption part of the recording/playback circuit in the optical disk recording/playback apparatus.

Here, in the optical disk recording/playback apparatus 20, the encryption part 30 creates the effective master key Kem from the master key Km on the basis of the medium identification information DiscID of the optical disk 1 which is authenticated by the authentication processing part 26, encrypts the disk key Kd by this effective master key Kem, encrypts an encryption key used for encrypting the user data, that is, the sector key Ks, by the disk key Kd, and records the user data encrypted by the sector key Ks, the encrypted disk key Kd, and the sector key Ks on the optical disk 1. However, the user data may be encrypted based on the medium identification information DiscID of the optical disk 1 which is authenticated by the authentication processing part 26. For example, as shown in FIG. 13, there is provided an effective sector key creation part 130 (Kes creation circuit) for creating an effective sector Kes from the sector key Ks generated as a random number in the random number generation circuit 32 on the basis of the effective master key Kem. The content data encryption circuit 35 uses the effective sector key Kes created by the sector key creation circuit 130 to encrypt user data and create encrypted content data.

Figure 14:
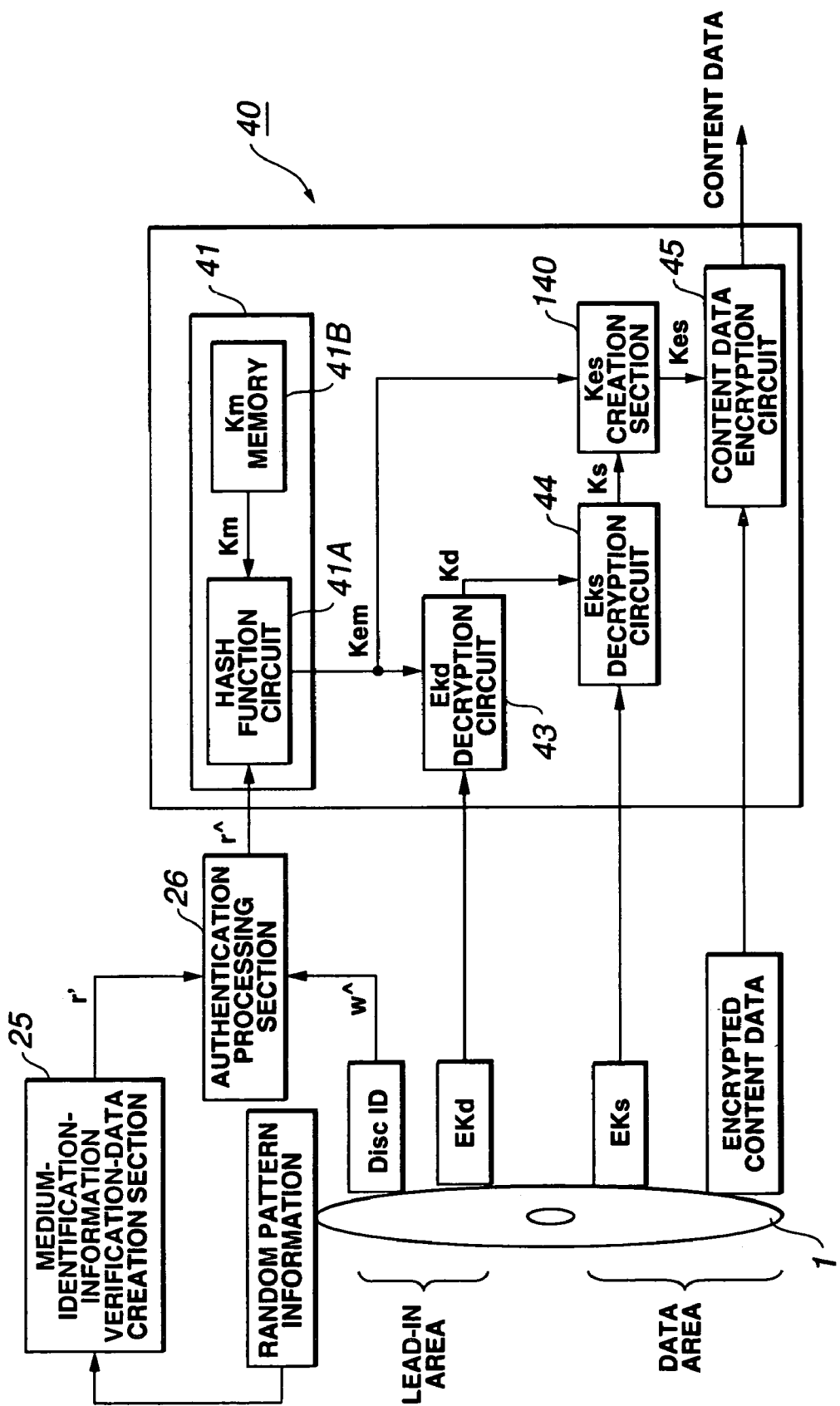
FIG. 14 is a block diagram showing another example of the construction of a decryption part of the recording/playback circuit in the optical disk recording/playback apparatus.

In this case, as shown in FIG. 14, the decryption part 40 is provided with an effective sector key creation circuit (Kes creation circuit) 140 for creating an effective sector key Kes from the sector key Ks on the basis of the effective master key Kem. The EKs decryption circuit 44 uses the disk key Kd to create a sector key Ks by decrypting the encrypted sector key EKs read by the recording/playback head 23 from the data area of the optical disk 1. From this sector key Ks, the effective sector key creation circuit 140 creates an effective sector key Kes. Using this effective sector key Kes, the content data decryption circuit 45 decrypts the encrypted content data.

Figure 15:
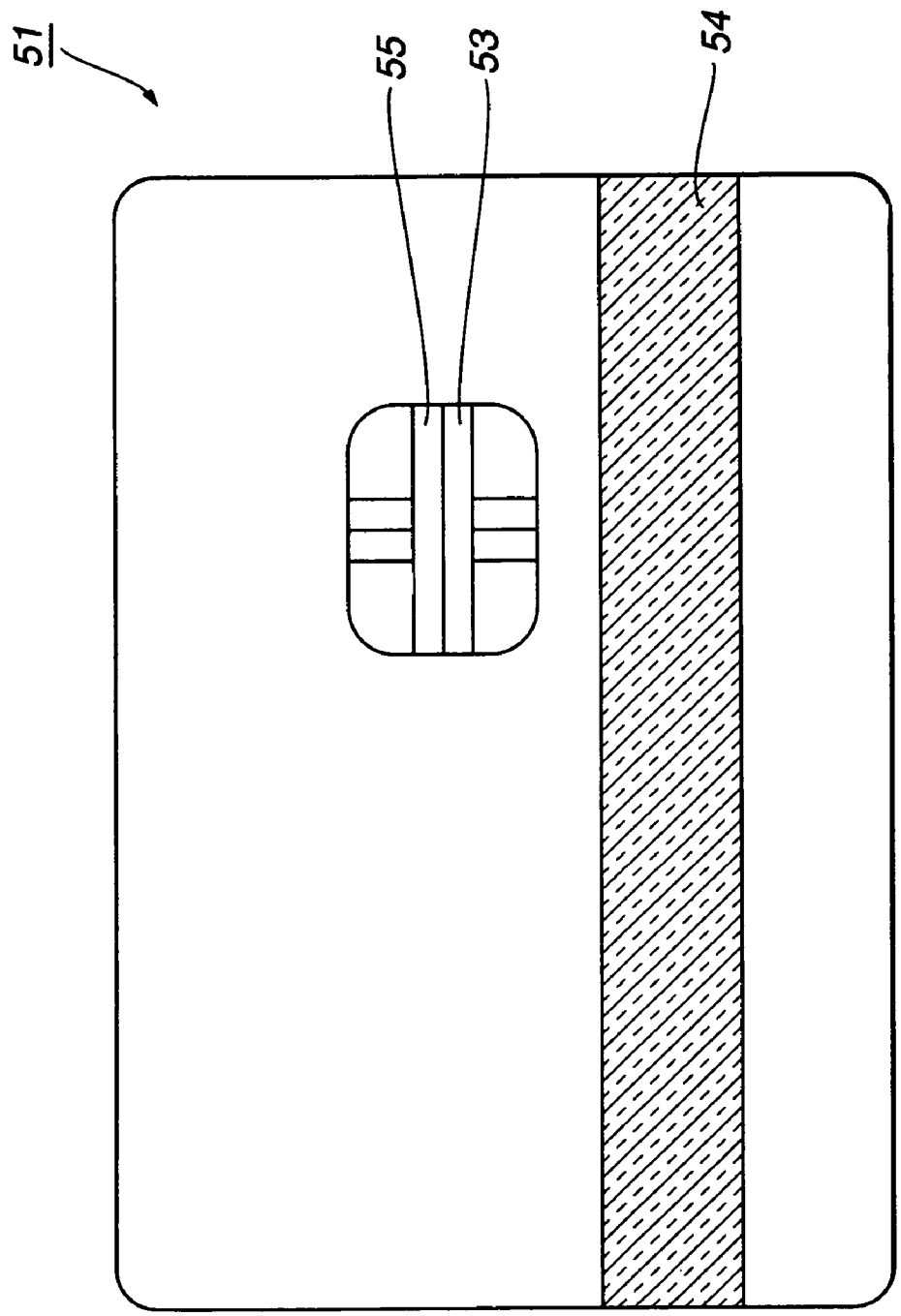
FIG. 15 is a view illustrating a card-shaped information recording medium to which the present invention is applied.

Although in the above-described embodiment, the present invention is applied to a recording/playback system using the optical disk 1 constructed as shown in FIG. 1, it is also possible to construct a recording/playback system using a card-shaped recording medium 51 such as that shown in FIG. 15.

More specifically, this card-shaped recording medium 51 shown in FIG. 13 comprises a user data recording part 53 in which user data is recorded, a random-pattern-information recording part 54 in which random pattern information from a random physical phenomenon is recorded, and an authentication data recording part 55 in which medium identification information created on the basis of the random pattern information detected from the random-pattern-information recording part 54, and the digital signature for each manufacturer with respect to the medium identification information are recorded as authentication data.

Like the above-described optical disk recording/playback system, the recording/playback system using the card-shaped recording medium 51 with such a construction detects random pattern information based on random physical phenomena from the random-pattern-information recording part 54, and creates medium identification information from the random pattern information. Furthermore, authentication data is read from the authentication data recording part 55 on the information recording medium, and authentication processing for the information recording medium can be performed based on the medium identification information created from the random pattern information and the authentication data. An encryption key is created from the medium identification information of the information recording medium authenticated by the authentication processing, and data which is encrypted with the encryption key is recorded/read via the user data recording part 53 on the authenticated information recording medium, making it possible to reliably prevent illegal copying of the information of the user data recording part 53.

As has been described above in detail, the embodiment of the present invention detects random pattern information based on random physical phenomena from the random-pattern-information recording part on the information recording medium which is provided with a random-pattern-information recording part including recorded therein random pattern information based on random physical phenomena, creates medium identification information from the random pattern information, and records, as authentication data, the medium identification information, together with a digital signature for each manufacturer with respect to the medium identification information, in the authentication data recording part on the information recording medium, making it possible to provide an information recording medium which records, as authentication data, medium identification information, together with a digital signature for each manufacturer with respect to the medium identification information, in the authentication data recording part. Then, with respect to the information recording medium including a random-pattern-information recording part including recorded therein random pattern information from a random physical phenomenon, an authentication data recording part including stored therein medium identification information created based on the random pattern information detected from the random-pattern-information recording part, and a digital signature for each manufacturer with respect to the medium identification information as authentication data, and a user data recording part in which user data is recorded, random pattern information based on random physical phenomena is detected from the random-pattern-information recording part, medium identification information is created from the random pattern information, and authentication data is read from the authentication data recording part on the information recording medium, and authentication processing for the information recording medium can be performed based on the medium identification information created from the random pattern information and the authentication data. An encryption key is created from the medium identification information on the information recording medium authenticated by the authentication processing, and data which is encrypted with the encryption key is recorded/read via the user data recording part on the authenticated information recording medium, making it possible to construct an illegal-copying prevention system which is also effective for writable media.

The invention claimed is:

1. An authentication data recording apparatus for recording data to a computer-readable storage medium, the authentication data recording apparatus comprising:
   a random pattern information detection part for detecting random pattern data from a read-only random pattern storage area of a computer-readable storage medium;
   an authentication data creation part for creating authentication data based on the random pattern data; and
   an authentication data recording part for recording the authentication data on an authentication data storage area on the computer-readable storage medium;
   wherein the computer-readable storage medium comprises the read-only random pattern storage area, the authentication data storage area, and a read/write user data storage area, and
   wherein the read-only random pattern area and the read/write user data storage area comprise distinct, nonoverlapping areas of the computer-readable storage medium, the read-only random pattern area being disposed outside the read/write user storage area, and
   wherein the read-only random pattern storage area comprises magnetized fibers randomly scattered on a random physical parameter of the computer-readable storage medium, and the authentication data is derived from the magnetized fibers random physical parameter.

2. The authentication data recording apparatus according to claim 1, wherein the computer-readable storage medium is a disc.

3. The authentication data recording apparatus according to claim 2, wherein the read-only random pattern area and the read/write user data storage area comprise distinct, nonoverlapping concentric rings on the disc.

4. The authentication data recording apparatus according to claim 1, wherein the authentication data recording area comprises a distinct area that does not overlap with the read-only random pattern area and the read/write user data storage area.

5. The authentication data recording apparatus according to claim 4, wherein:
   the computer-readable storage medium is a disc, and the read-only random pattern area, the read/write user data storage area, and the authentication data recording area comprise distinct, nonoverlapping concentric rings on the disc.

6. A playback apparatus for playing back data from a computer-readable storage medium, the playback apparatus comprising:

a random pattern information detection part for detecting random pattern data from a read-only random pattern storage area of a computer-readable storage medium;

a verification data creation part for creating verification data based on the random pattern data; and an authentication processing part for authenticating the computer-readable storage medium by comparing the verification data with authentication data read from an authentication data storage area on the computer-readable medium;

wherein the computer-readable storage medium comprises the read-only random pattern storage area, the authentication data storage area, and a read/write user data storage area, and wherein the read-only random pattern area and the read/write user data storage area comprise distinct, nonoverlapping areas of the computer-readable storage medium, the read-only random pattern area being disposed outside the read/write user storage area, and wherein the read-only random pattern storage area comprises magnetized fibers randomly scattered on a random physical parameter of the computer-readable storage medium, and the authentication data is derived from the magnetized fibers random physical parameter.

7. The playback apparatus according to claim 6, wherein the computer-readable storage medium is a disc.

8. The playback apparatus according to claim 7, wherein the read-only random pattern area and the read/write user data storage area comprise distinct, nonoverlapping concentric rings on the disc.

9. The playback apparatus according to claim 6, wherein the authentication data recording area comprises a distinct area that does not overlap with the read-only random pattern area and the read/write user data storage area.

10. The playback apparatus according to claim 9, wherein:
the computer-readable storage medium is a disc, and
the read-only random pattern area, the read/write user data storage area, and the authentication data recording area comprise distinct, nonoverlapping concentric rings on the disc.

* * * * *